C. H. WILLIAMS, Jr.
THIRD SUSPENSION FOR BRAKE BEAMS.
APPLICATION FILED NOV. 11, 1910.
997,888.
Patented July 11, 1911.
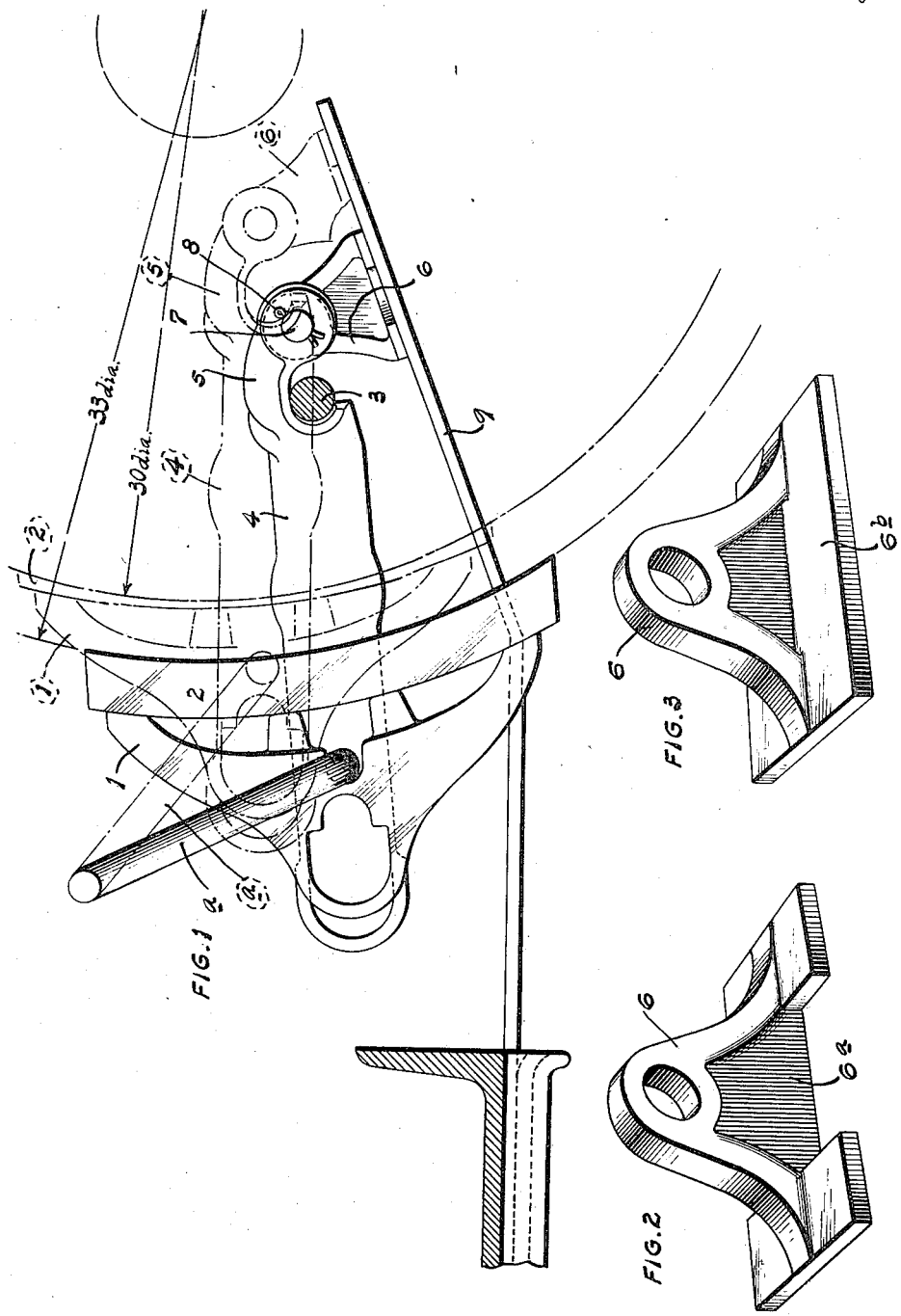

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD SUSPENSION FOR BRAKE-BEAMS.

997,888.

Specification of Letters Patent.

Patented July 11, 1911.

Application filed November 11, 1910. Serial No. 591,918.

*To all whom it may concern:*

Be it known that I, CHARLES H. WILLIAMS, Jr., a citizen of the United States, residing at Chicago, Illinois, have invented a certain new and useful Improvement in Third Suspensions for Brake-Beams, of which the following is a full, clear, and exact description, such as will enable others skilled in the art to which it appertains to make and use the same, reference being had to the accompanying drawings, forming part of this specification, in which—

Figure 1 is a side elevational view illustrating my improved brake beam suspension; Fig. 2 is a detail view of the third suspension shoe or carrier; and Fig. 3 is a modified form of the carrier.

This invention is a new and useful improvement in third suspensions for brake beams of that type illustrated in the application of Ernest A. Le Beau, filed August 19, 1910, serially numbered 577,963. In the Le Beau application mentioned there is shown a spring member extending from some part of the truck and having its end inclined upwardly for coöperation with the carrier mounted upon the end of the strut or lever post of the brake beam. According to Le Beau's invention, the carrier embraces the end of the third suspension spring, and in order to remove the beam, the carrier must either be disconnected therefrom or parts of the carrier removed, which necessitates the presence of a workman under the truck. According to my present invention, the shoe or carrier is not attached to the third suspension spring, but rides thereon, and is free to be disconnected therefrom by lateral or upward movement without necessitating removal of any parts or fastening devices. By this present construction interchange with existing forms of beams is possible, as no modification of the brake beam is necessary for either old or new equipment. The shoe or carrier is preferably loosely mounted in the end of the strut or brake lever post, but it is obvious that it could be made rigid. This shoe rides freely on the third suspension spring, but is in no way attached to it, so that any derangement of said spring will not affect the brake beam in any way, as would be the case if it was connected with or attached to this spring. For instance, should anything cause the third suspension spring to be torn from the truck, or distorted, this fact would not disturb, injure or destroy the brake beam, but leave it intact and operative.

Railroads are at present using a large number of forged rolled steel wheels, which are capable of being turned down in the truing operation, so that their diameter is thus reduced. Ordinarily, these wheels are made thirty three inches in diameter and may be turned down to thirty inches. This reduction in the diameter of the wheel materially affects the brake beam, and particularly, with relation to the suspension spring.

The present invention consists in providing the inner end of the strut or lever post or brake beam with a carrier or shoe either loosely or rigidly connected thereto, said shoe having a flat supporting face whereby it is maintained in proper relation with the inclined track or third suspension spring, which latter is secured to the spring plank or other part of the track frame.

In the drawings, Fig. 1 shows in full lines the position of the brake beam when used with a new shoe, of a wheel thirty-three inches in diameter, and in dotted lines the position of said beam and hanger when the wheel is worn and the diameter of the wheel reduced to thirty inches. This drawing clearly illustrates how the beam is not only thrown forwardly, but upwardly, by the reduced diameter of the wheel and the wearing of the shoe, the brake shoe being thus properly applied to the wheel in all gradations of this wearing and wheel reduction. In other words, the hanger *a*, which is usually connected to the brake head, swings inwardly and upwardly to cause the brake beam to move in the arc of a circle. On the application of the brakes, the shoe or carrier will ride upwardly and cause the inner end of the brake beam to likewise move inwardly and upwardly, thus maintaining substantial parallelism or concurrence with the action of the beam hanger proper. The carrier forming the supporting element for the inner end of the strut, is preferably made separate from the strut, although it may be cast integral therewith. By being made separately, no change in the strut casting is necessary.

In the drawings, 1 indicates the head of a brake beam and 2 the shoe thereof.

3 is the tension member, and 4 the strut, which latter is provided with a nose or extension 5 of any desired form for the third suspension shoe or carrier.

6 is the shoe or carrier, preferably in the form of a casting, having an upward extension provided with an opening through which passes a pivot pin 7 held in position by a cotter 8.

9 is the third suspension spring, whose inner end is shown inclined upwardly.

In Figs. 1 and 2, I have shown a shoe or carrier as having two flat end-supporting surfaces connected by a central rib 6ª so as to prevent the outermost flat surface from falling down over the end of the spring and arresting the brake beam in its innermost or applied position, and so preventing the release of the beam.

In Fig. 4, I have shown the shoe or carrier provided with an uninterrupted supporting surface 6ᵇ.

What I claim is:

1. In a third suspension for brake beams, the combination of a suspension track having an inclined portion, and a carrier mounted on the brake beam and free to move upwardly.

2. In a third suspension for brake beams, the combination of a suspension track having an inclined portion, and a carrier mounted on the brake beam and free to move laterally.

3. In a third suspension for brake beams, the combination of a suspension spring having an inclined portion, and a carrier riding on said spring and free to move laterally and vertically.

4. In a third suspension for brake beams, the combination of a suspension track having an inclined portion, and a carrier having a flat supporting face coöperating with said track, said carrier being unattached to the track.

5. In a third suspension for brake beams, the combination of a suspension track having an inclined portion, and a carrier having a flat supporting face coöperating with said track and being pivotally connected to said beam.

6. In a third suspension for brake beams, the combination of a brake beam having a brake lever post, a third suspension carrier connected to the inner end of said post and having a continuous flat supporting surface whereby it is maintained in proper relation to the supporting member, and a supporting member for said carrier.

7. A carrier for brake beams, comprising means for connection with the beam, and having an elongated continuous bearing for coöperating with a supporting member.

8. A carrier for brake beams, comprising a casting having means for connection with the brake beam, and a continuous flat supporting surface for coöperation with the carrier.

9. A carrier for brake beams, comprising a casting having means for connection with the beam, and a continuous flat supporting surface, said surface being reduced in width at its middle portion.

10. A carrier for brake beams, comprising means for connection with the beam, said carrier also having an elongated bearing for coöperating with the supporting member.

In testimony whereof I hereunto affix my signature in the presence of two witnesses, this 25th day of October, 1910.

CHARLES H. WILLIAMS, Jr.

Witnesses:
E. T. WALKER,
M. F. HUNTOON.